United States Patent [19]

Champion

[11] Patent Number: 5,383,184
[45] Date of Patent: * Jan. 17, 1995

[54] MULTI-SPEAKER CONFERENCING OVER NARROWBAND CHANNELS

[75] Inventor: Terrence G. Champion, Hudson, N.H.

[73] Assignee: The United States of America as represented by the Secretary of the Air Force, Washington, D.C.

[*] Notice: The portion of the term of this patent subsequent to May 31, 2011 has been disclaimed.

[21] Appl. No.: 152,632

[22] Filed: Nov. 5, 1993

Related U.S. Application Data

[63] Continuation of Ser. No. 760,021, Sep. 12, 1991, Pat. No. 5,317,567.

[51] Int. Cl.⁶ .............................................. H04M 3/42
[52] U.S. Cl. ....................................... 370/62; 370/79; 370/80; 370/118; 379/202; 381/29; 381/30
[58] Field of Search ................. 370/62, 79, 80, 118; 379/158, 202, 206; 381/29-31

[56] References Cited

U.S. PATENT DOCUMENTS

| | | | |
|---|---|---|---|
| 3,970,797 | 7/1976 | Johnson et al. | 179/15 AT |
| 4,270,025 | 5/1981 | Alsup et al. | 179/15.55 R |
| 4,271,502 | 6/1981 | Goutmann et al. | 370/62 |
| 4,313,033 | 1/1982 | Walker et al. | 179/1 H |
| 4,435,832 | 3/1984 | Asada et al. | 381/34 |
| 4,441,201 | 4/1984 | Henderson et al. | 381/51 |
| 4,618,982 | 10/1986 | Horvath et al. | 381/36 |
| 4,679,187 | 7/1987 | Irvin | 370/17 |
| 4,856,068 | 8/1989 | Quatieri, Jr. et al. | 381/36 |
| 4,885,790 | 12/1989 | McAulay et al. | 381/36 |
| 4,937,873 | 6/1990 | McAulay et al. | 381/51 |
| 5,065,395 | 11/1991 | Shenoi et al. | 370/81 |

*Primary Examiner*—Douglas W. Olms
*Assistant Examiner*—Russell W. Blum
*Attorney, Agent, or Firm*—Donald J. Singer; William G. Auton

[57] ABSTRACT

A system for digital conferencing over narrowband channels which allows use by multiple simultaneous speakers and which allow for interfacing between vocoders which operate at different bit rates. The system takes advantage of the properties of multi-rate parametric vocoders (which includes the Sinusoidal Transform Coder and the Multi-Band Excitation Vocoder, as well as embedded coders), defined as parametric vocoders for whom the basic model and parameter set remain unchanged over a wide range of bit-rates. The system performs signal summation. To maintain quality for a single speaker while allowing multiple speakers, the system adaptively allocates channel bandwidth based on the number of speakers to be represented. This system also provides digital-to-digital conversion between narrow-band digitizers (vocoders) operating at different bit-rates. The system takes advantage of the characteristics of a particular class of coders, sine-wave based coders, which perform parameter estimation by sine-wave summation. Digital-to-digital conversion is performed by estimating the parameter set associated with the lower bit-rate digitizer from the parameter set associated with the higher bit-rate.

7 Claims, 11 Drawing Sheets

SYNTHESIZER

MULTI-SPEAKER CONFERENCING OVER NARROWBAND CHANNELS

STATEMENT OF GOVERNMENT INTEREST

The invention described herein may be manufactured and used by or for the Government for governmental purposes without the payment of any royalty thereon.

REFERENCE TO MICROFICHE APPENDIX

Reference is made to the microfiche appendix which contains 1 sheet representing 10 frames of the conferencing bridge source code.

This application is a continuation of application Ser. No. 07/760,021, now U.S. Pat. No. 5,317,567, filed 12 Sep. 1991.

BACKGROUND OF THE INVENTION

The present invention relates generally to digital voice conferencing systems which provide digitally encoded voice communication to remotely located digital voice terminals, and more specifically to a system for facilitating multispeaker conferencing on vocoders which use narrowband channels (such as 4.8 kb/second). The present invention also provides a system that allows digital-to-digital conversion between vocoders which output digital data streams at different bit rates.

A vocoder (voice operated coder) is a device used to enable people to participate in private communication conferences over ordinary telephone lines by encoding their speech for transmission, and decoding speech for reception. The vocoder unit consists of an electronic speech analyzer which converts the speech waveform to several simultaneous electronic digital signals, and an electronic speech synthesizer which produces artificial sounds in accordance with the encoded electronic digital signals received.

The problem of conferencing over systems which employ parametric vocoders has long been of interest. In analog or wideband digital conferencing, overlapping speakers are handled by signal summation at a conferencing bridge. Such a scheme is not feasible for parametric vocoders for two reasons: 1) signal summation would require tandeming, synthesis and reanalysis of the speech waveform, a process which causes severe degradations in narrowband parametric vocoders; 2) narrowband vocoders cannot satisfactorily represent multiple speakers. One of the difficulties in combining two or more voice tracks is that you end up with two fundamental frequencies: one for each voice signal. These are difficult to encode and separate.

One narrowband technique currently in use is based on the idea of signal selection: a speaker has the channel until he finishes or someone with a higher priority bumps him, and speakers vie for the open channel when it becomes available. The advantage of such a technique is that it avoids the degradations described above; however, such a technique is cumbersome since most conference control is handled by interruptions and overlapping speakers, and this scheme presents only one speaker to the listener. Some coders have some capability of representing multiple speakers; however, the speech quality is significantly degraded due to the tandem between coders. In other schemes two-speaker overlaps can be accomplished by permanently halving the available bandwidth alloted to each coder and deferring signal summation to the terminal. This scheme limits the overall quality of the conference by forcing the coder to work at half the available bandwidth. Since, for the majority of a conference, there will be only a single speaker, this technique causes a degradation in perceived quality.

Examples of vocoder system technology are discussed in the following U.S. Patents, the disclosures of which are incorporated herein by reference:

U.S. Pat. No. 4,856,068 issued to Quatieri, Jr. et al;
U.S. Pat. No. 4,885,790 issued to McAulay et al;
U.S. Pat. No. 4,270,025 issued to Alsup et al;
U.S. Pat. No. 4,271,502 issued to Goutmann et al;
U.S. Pat. No. 4,435,832 issued to Asada et al;
U.S. Pat. No. 4,441,201 issued to Henderson et al;
U.S. Pat. No. 4,618,982 issued to Horvath et al; and
U.S. Pat. No. 4,937,873 issued to McAulay et al.

All of the above-cited patents disclose digital vocoders and voice compression systems that can be improved by the present invention. Of particular interest are the Quatieri, Jr. et al and McAulay et al references which disclose vocoder systems with equipment used by the present invention.

The inherent problems encountered by all of the prior art vocoder systems is a result of the difficulty in realistically representing human speech in limited narrowband channels. As pointed out in the Goutmann et al reference, current digital voice terminals currently achieve bit rates ranging between 2.4 to 32 kilobits per second. One of the most common systems uses 4.8 kb/second. When a user of a system that uses only a 4.8 kb/second data stream is attempting to communicate with a user of a 2.4 kb/second data stream, a means of converting the bit rate signals becomes necessary. The present invention provides examples with specific kb/second ranges, however it should be understood that this invention is not limited to these specific data bit rates. Although the example includes the use of modems and telephone lines, the invention is applicable over any media that transmits digitally encoded voice signals. These media systems include, but are not limited to: radio transmissions, satellite communication systems and laser communication systems.

In view of the foregoing discussion, it is apparent that there remains an ongoing need to enhance the ability of digital vocoders to handle mutlispeaker conferencing on narrowband channels, and to interface vocoders which have different bit rate data streams while preserving voice quality. The present invention is intended to help satisfy that need.

SUMMARY OF THE INVENTION

The present invention includes a digital conversion system that can be used to facilitate multispeaker conferencing on narrowband vocoders, and which also permits interaction between users of vocoders which operate at different system data bit rates. Vocoders generally output digitally encoded voice signals to each other using a communications network, such as a set of modems and the telephone lines. The present invention uses a conferencing bridge to receive, convert and output digital data streams for either multispeaker conferencing or for interaction between vocoders which operate at different system data bit rates. This conferencing bridge can be either a handwired circuit or a computer which uses the source code of the microfiche appendix, and which operates as described below.

When the conferencing bridge performs multispeaker conferencing between vocoders which each operate at the same system data rate, the following four step process is conducted. The first step includes counting the number of active conferees to produce thereby a count number N, the active conferees being users of the digitally encoded voice system. The second step of the process includes compressing each of the encoded digital voice signals produced by the active conferees down to a plurality of compressed digital signals which each have a compressed data rate. The third step is a digital signal summation step in which the compressed digital signals are combined to output thereby a combined compressed digital signal which is sent back to the users at the system data rate. The fourth step of the process is performed by the synthesizers of the vocoders. More specifically, the fourth step of the process is performed by the vocoders decoding the combined compressed digital signal to output thereby an artificial voice signal to the users of the digitally encoded voice system, wherein the artificial voice signal represents voices of all the active conferees which are speaking.

When the conferencing bridge is used to interface vocoders which are operating at different data stream bit rates, the conferencing bridge performs a two step process. The first step includes measuring each of the particular data stream bit rates produced by each of the digitally encoded voice systems to produce thereby a set of data stream bit rates which are identified for each particular digitally encoded voice system. The second step includes combining and converting all received encoded digital signals into a set of converted encoded digital signals which are each sent back to the digitally encoded voice system at their particular data stream bit rate.

In both of the applications described above, compression and conversion of digital data streams can be performed by techniques that include but are not limited to: the parameter de-scoping technique, the fame dilation technique, and the heterogenuous transform technique. Parameter de-scoping entails decreasing the resolution and/or dynamic range of the parameterization. For example, 7 bits (128 values) may be allowed to code the fundamental frequency parameter $f_o$ at a given bit-rate, while 5 bits (32 values) may be allowed for a lower bit-rate. Either the dynamic range of the parameter must be compressed or the spacing between coded values must somehow be increased, or both, to allow $f_o$ to be coded with 5 bits. Once the values for the different parameterizations has been set, a one-to-one mapping can be set up. While for some parameters it may be efficient to map directly from one coded parameter to its lower bit-rate counterpart, other parameters might be decoded, and the estimated parameter recorded at the lower resolution parameterization.

In the frame dilation technique, bit-rate reduction can also be achieved by keeping the same parameter resolution while increasing the frame length. With this technique the parameters themselves are considered to be a set of time-varying functions, which are sampled at a higher rate for the high bit-rate parameterization and down-sampled for the lower rate parameterization. For example, a parameter stream at a 4.8 kb/s with a parameter sampling rate of 20 ms can be resampled at 30 ms to produce a parameter stream of 3.6 kb/s without decreasing the resolution of the parameter set.

The heterogenuous transform technique can be to transform between parameterizations which are based on different speech models. For example, two alternate ways of representing the spectral envelope $H(\omega)$ are cepstral smoothing an linear prediction. If one has chosen to code cepstral coefficients at a higher bit-rate and linear prediction coefficients at a lower bit-rate, one can reconstruct the spectral envelope from cepstral coefficients, derive an estimate of the autocorrelation function from the spectral envelope, and derive the reflection coefficients.

It is an object of the present invention to provide a system for facilitating multispeaker conferencing between users of digitally encoded voice systems.

It is another object of the present invention to provide a data rate conversion system to interface vocoders which operate at different digital system data rates.

These together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a digital summation system which facilitates multispeaker conferencing on vocoders which are narrowband channels (such as, but not limited to 4.8 kb/second).

One embodiment of the invention consists of a speech terminal for each conferee and a conferencing bridge. The speech terminal analyzes the conferee's voice and codes at the highest bit-rate allowed by the channel connecting the terminal to the bridge. The conferencing bridge monitors all channels and determines which conferees are actively speaking. The bridge determines the number of active speakers and allocates the bandwidth available to each conferee based on the number of speaker parameter sets to be transmitted. After allocating the channel to the active speaker, the bridge uses parameter-space transformations to reduce the bandwidth required to encode the parameter sets. When there is only one speaker, all conferees receive the single speaker at the highest data rate allowed by each conferees channel. When a collision between two speakers occurs, the bridge allocates to each speaker half the available channel bandwidth, while performing bit-rate reduction by parameter-space transformations on the active speakers to allow both data-streams to fit in the channel. In a typical scenario with three conferees and two interrupting speakers, over 4.8 kb/s channels, the non-speaking listeners receive the two colliding speakers at 2.4 kb/s, as discussed below.

Figure 1:
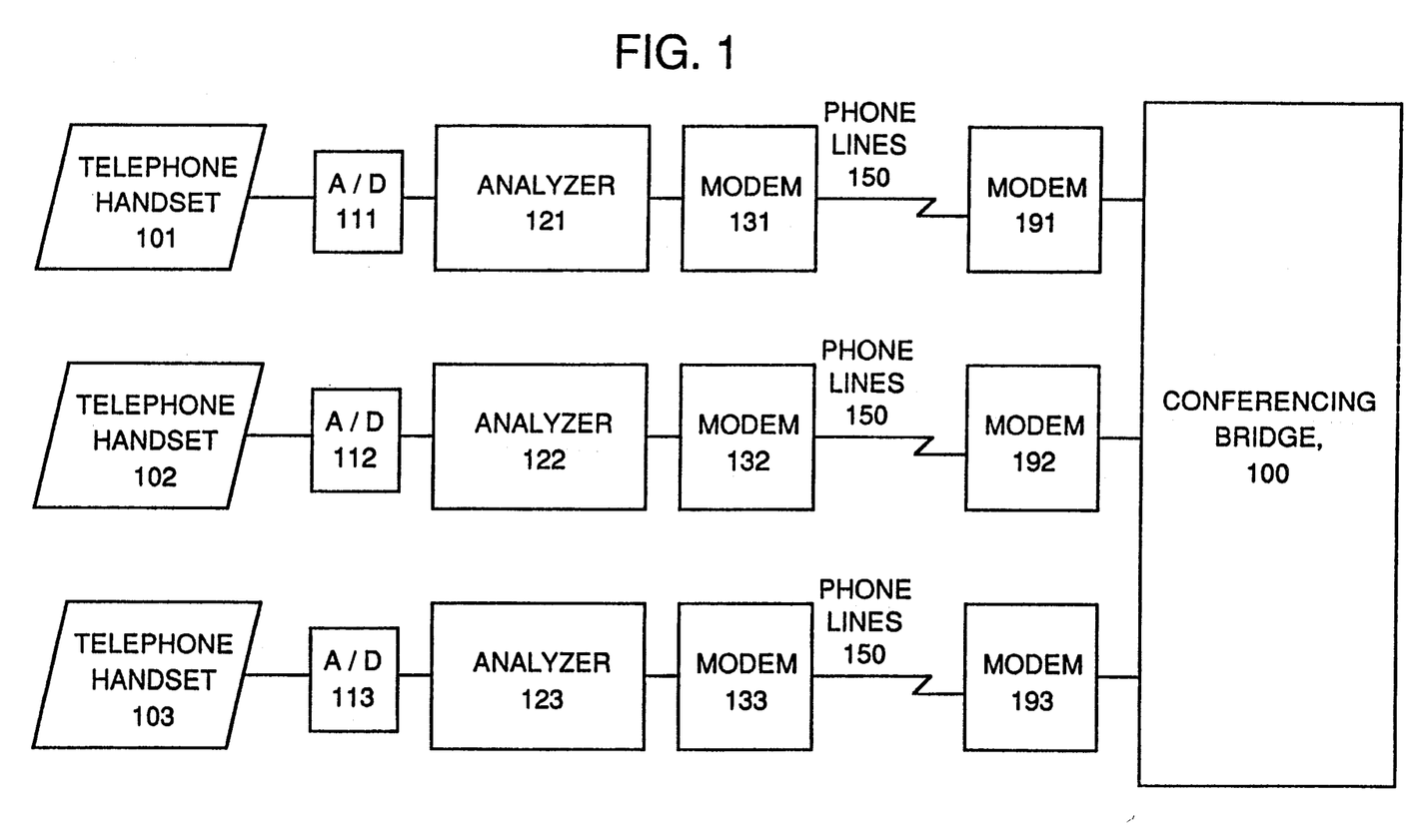
FIG. 1 is a block diagram of the conferencing bridge of the present invention which traces the electrical signals from multiple conferees to the conferencing bridge.

The reader's attention is now directed towards FIG. 1, which is a block diagram of the conferencing bridge 100 of the present invention facilitating multispeaker conferencing and digital rate conversion between the users of telephone handsets 101–103. As shown in the FIG. 1, three A/D converters 111–113 convert analog voice signals into digital voice signals, which are respectively encoded by three analyzer units 121–123 of a vocoder (as discussed in the above-cited patents). More specifically, all three analyzer units 121–123 are included in the output ports of current vocoder units. As mentioned above, vocoders are used to encode and compress voice signals (using an analyzer) and then decode and produce artificial speech from received signals (using a synthesizer).

The three modem units 131–133 transmit the digital output signals of the analyzers 121–123 over the phone lines 150 where they are conducted by their respective bridge modems 191–193 to the conferencing bridge unit 100.

The present invention includes, but is not limited to, two different embodiments. In the first embodiment of the invention, the conferencing bridge 100 is used to allow smooth digital-to-digital conversion between multiple vocoder analyzers 121–123 which output digital data streams at different bit rates. In the second embodiment, the conferencing bridge will perform digital data compression to allow multispeaker conferencing between multiple voice digitizers (vocoders) which are only capable of outputting and receiving a digital data stream at a single system data rate. In the second embodiment of the invention the conferencing bridge 100 will multiplex the inputs of conferees speaking simultaneously so that the users of the vocoders can hear all active conferees by receiving a single combined digital data stream at the system data rate. Of these two embodiments of the invention, the first embodiment will be described first in the discussion that follows.

Figure 2:
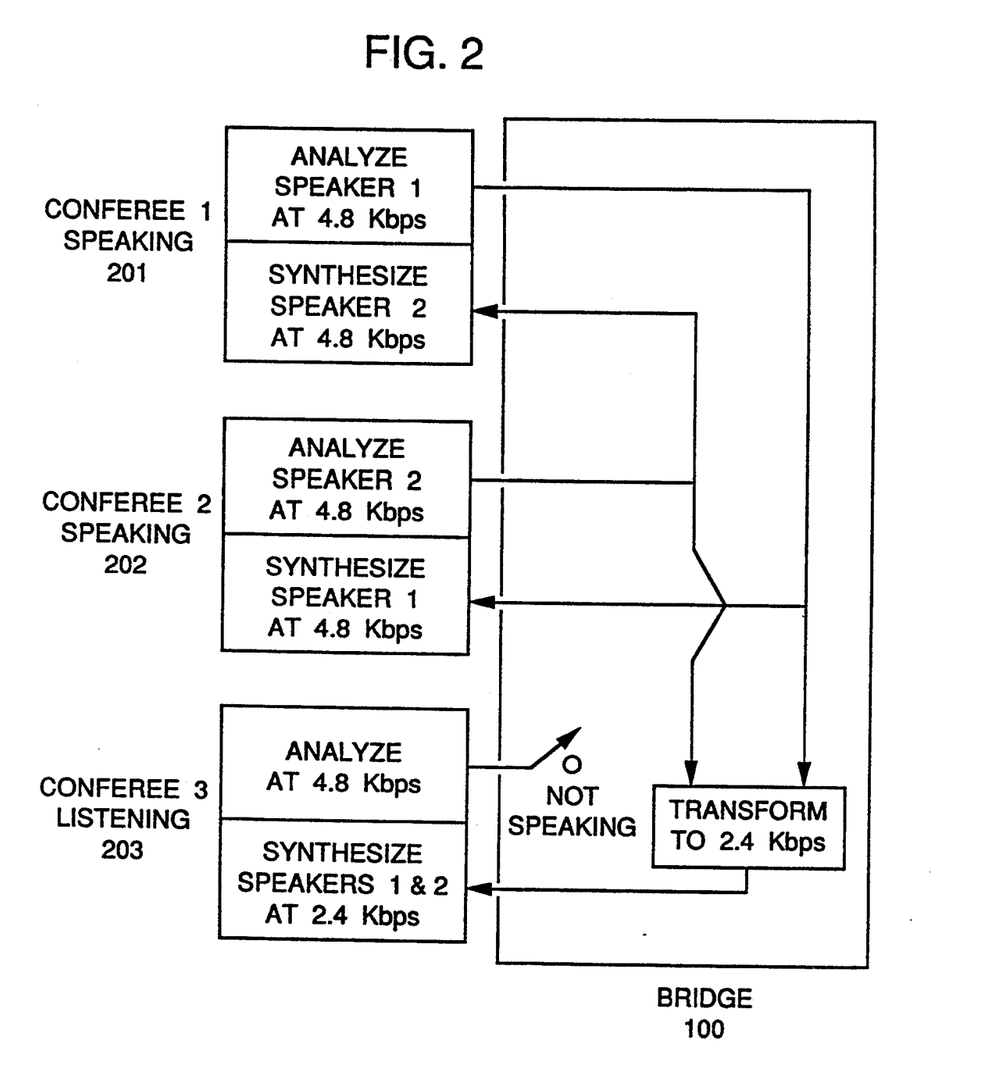
FIG. 2 is a block diagram of the conferencing bridge interconnecting three remote vocoders.
Figure 3:
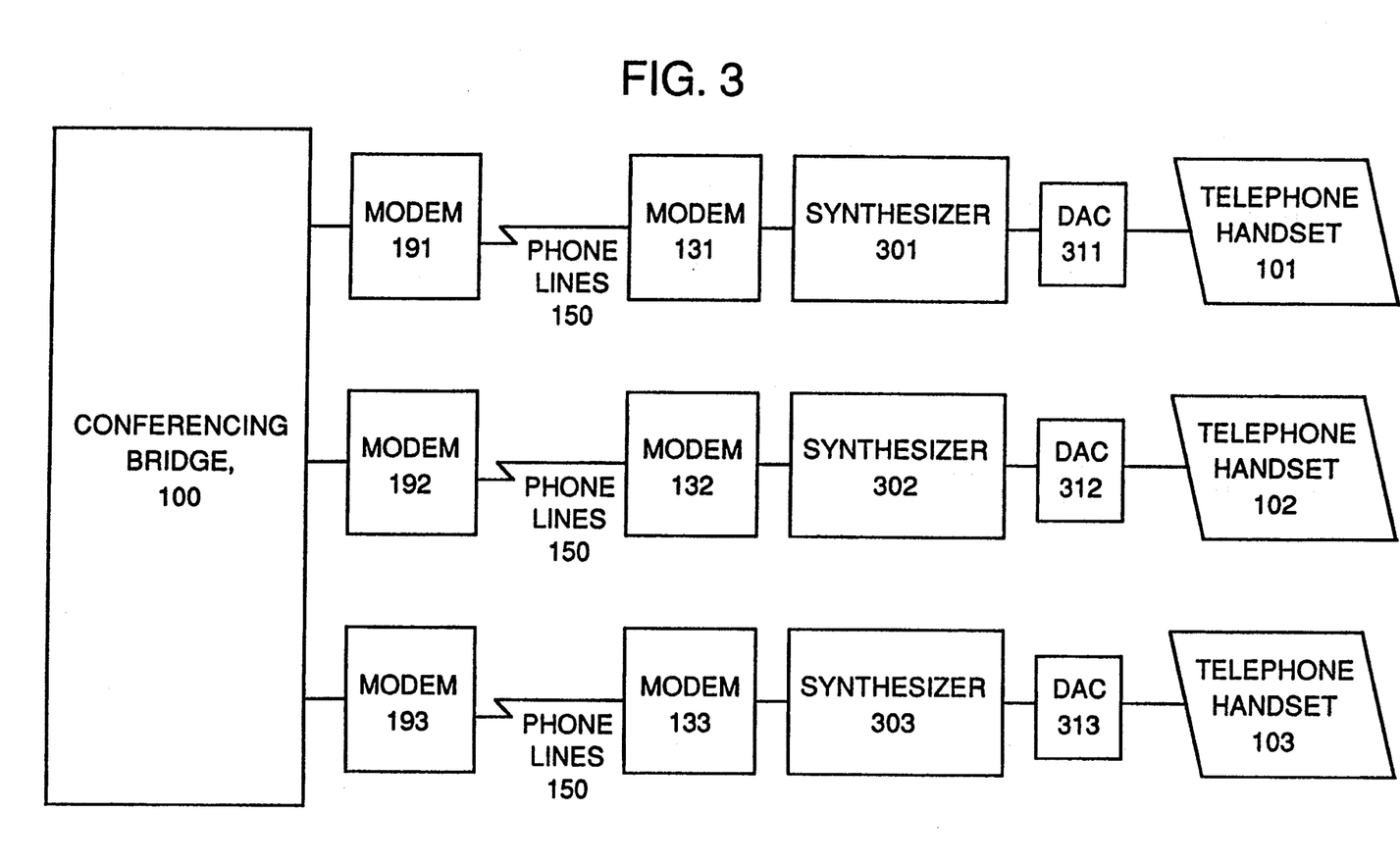
FIG. 3 is a block diagram which traces electrical signals out of the conferencing bridge back to the users of three vocoders.

In the first embodiment of the present invention, the vocoder analyzers 121–123 can be the sinusoidal transform coders such as those used in the above-cited McAulay reference, but which each operate at a different system data rate. The function of the conferencing bridge 100 is to perform digital-to-digital conversion between each of the vocoders so that each vocoder can receive the digitized voice data produced by the other vocoders, as shown in FIGS. 2 and 3, as discussed below. Digital-to-digital conversion is performed by estimating the parameter set associated with the lower bit-rate analyzer from the parameter set associated with the higher bit-rate.

In the present invention, the conferencing bridge 100 is a computer which performs data conversion using a subroutine in the program of the microfiche appendix. This conversion can be done by three different techniques as well as a combination of these and other techniques, as described below.

The above-cited patents of McAulay et al and Quatieri et al describe sinusoidal models for acoustic waveforms. One of the parametric coders for which the present invention will work is the Sinusoidal Transform Coder (STC). The underlying model for the STC working at bit-rates from 8 kb/s is $$s[n] = \sum_{k=1}^{K} H(k2\pi f_o)\exp(k2\pi f_o(n - n_0) + \phi(k2\pi f_o) + \widetilde{\psi}[2\pi k f_o] \quad (1)$$

whereto $f_o$ is an estimate of fundamental frequency, $H(\omega)$ is an estimate of the magnitude of the speech spectrum, phi($\omega$) is the minimum-phase phase estimate, and $\widetilde{\chi}[2\pi k f_o]$ is an estimate of the residual phase (that is, the difference between the true phase and the first two terms in the agreement of the exponential). The variable $\chi[2\pi k f_o]$ is defined $$\widetilde{\phi}[k\omega_o] = (1 - P_\gamma)\widetilde{\chi} \quad (2)$$

where $p_\gamma \in [0,1]$ is a voicing measure determined during analysis, and $\widetilde{\chi}$ is a random variable uniformly between $-\pi$ an $\pi$. For coding any parameterization $\Omega$ which includes an estimate of $f_o$, $p_\gamma$, and $H(\omega)$ can be used to transmit the information from analyzer to synthesizer. The Multi-Band Excitation (MBE) is similar except that there is a set of voicing parameters $\{P_\gamma{}^i\}$ corresponding to different frequency regions where $P_\gamma{}^i$ equals either 1 or 0. The fact that analysis/synthesis for these types of coder is largely independent of the type of parameterization used for coding allows a great deal of freedom for translating between parameterizations; one set of parameters for a given bit-rate M BPS (the parameter set will be designated $\widetilde{\Delta}_M$) can be fit to another coded set of parameters for another bit-rate K BPS ($\widetilde{\Delta}_K$). The resulting speech quality is largely a matter of parameter resolution of the lowest bit-rate parameter set.

The first data conversion technique is parameter descoping, which entails decreasing the resolution and/or dynamic range of the parameterization. For example, 7 bits (128 values) may be allowed to code the fundamental frequency parameter $f_o$ at a given bit-rate, while 6 (64 values) may be allowed for a lower bit-rate. Either the dynamic range of the parameter must be compressed or the spacing between coded values must somehow be increased, or both, to allow $f_o$ to be coded with 6 bits.

As an example, let $\{p_i{}^\alpha\}$ be the set of coded pitch values allowed for the source coder with 7 bits allocated for pitch, and $\{p_i{}^\beta\}$ be the set of coded bit pitch values allowed for the target coder working at with 6 bits allocated for pitch, defined by the equations $$p_i{}^\alpha = (1+\alpha)p_{i-1}{}^\alpha \quad (3)$$

$$p_i{}^\beta = (1+\beta)p_{i-1}{}^\beta \quad (4)$$

where $p_0{}^\alpha$ and $p_0{}^\beta$ are the lowest allowable coded pitch values and $\beta$ and are determined by the range of pitch values to be coded. The transformed pitch value $\widetilde{f}_o$ for the received pitch value $p_i{}^\alpha$ is $p_j{}^\alpha$, where j is defined $$|p_i{}^\alpha - p_j{}^\beta|) \leq |p_i{}^\alpha - p_l{}^\beta| \quad (5)$$

for any $|\epsilon[0, 64]$. Once the values for the different parameterizations has been set, a one-to-one mapping can be set up.

While for some parameters it may be efficient to map directly from one coded parameter to its lower bit-rate counterpart, other parameters might be decoded, and the estimated parameter recorded at the lower resolution parameterization.

The spectrum is coded when it is split into N bands, or channels. The center frequencies for the channels below 1000 Hz are linearly spaced, while those above 1000 Hz are logarithmically spaced. For channel h in the non-linear region the center frequency is $$\omega_k = (1+\sigma)\omega_{k-1} \quad (6)$$

The channel gains are derived in the following manner. Cepstral coefficients are calculated from a smoothed representation $S(\omega)$ of the log-magnitude spectrum by means of the equations:

$$c_0 = \frac{1}{2K-1}\left(S(0) + 2\sum_{k=1}^{K-1} S(\omega_k)\right) \quad (6A)$$

$$c_k = \frac{1}{2K-1}\left(S(0) + 2\sum_{k=1}^{K-1} S(\omega_k)\cos(\omega_k)\right) \quad (6B)$$

The channel gains $F_k$ are calculated from the cepstral coefficients by means of the equations $$F_0 = c_0 + 2\sum_{k=1}^{K-1} c_k \quad (6C)$$

$$F_k = c_0 + 2\sum_{k=1}^{K-1} c_k\cos(\omega_k) \quad (6D)$$

These equations, along with equations $$c_0 = \frac{1}{2K-1}\left(F_0 + 2\sum_{k=1}^{K-1} F_k\right) \quad (6E)$$

$$c_k = \frac{1}{2K-1}\left(F_0 + 2\sum_{k=1}^{K-1} F_k\cos(\omega_k)\right) \quad (6F)$$

define an invertible transform between the cepstral and channel representations. The channel gains $F_k$ are the transmitted parameters; from them the cepstral coefficients are recovered by means of equations 6E and 6F. The cepstral coefficients are then used to derive a cepstrally smoothed spectral envelope $\hat{S}(\omega)$ in the usual manner. The sinewave amplitudes are estimated by sampling $\hat{S}(\omega)$ at the harmonics of the fundamental frequency $\omega_o$. Since $\hat{S}(\omega)$ represents the log-magnitude spectrum, $S(k\omega_o)$ must be exponentiated in order to be used as an estimate of the sinewave amplitude $a_k$. Each channel gain $F_h$ is differentially coded from the previous gain $F_{h-1}$ $$F_h = F_{h-1} + \Delta_h \quad (7)$$

where $\Delta h$ is one of a set of discrete values. The number of values $\Delta h$ can take on is dependent on the number of bits allocated to it. The parameters that can be varied in any parameterization of the spectrum are the frequency range that is to be represented $\Omega$, the spacing of the linear channels L, the number of channels N, and the number of bits allocated to each channel.

Parameter de-scoping can be accomplished by decreasing the number of channels N. If $\Omega$ remains the same, decreasing the number of channels decreases the resolution of the parameterization. Further parameter descoping can be achieved by reducing the number of bits allocated to each channel. Finally, parameter de-scoping can be accomplished by reducing the frequency range $\Omega$ to be coded, which produces a somewhat tinnier output.

Given the many degrees of freedom available to reduce the bit allocation requirements for the spectrum, the most efficient way to perform the transformation is to reconstruct the spectral envelope estimate $\hat{H}(\omega)$ at the higher resolution and record at the lower resolution.

In the second data conversion technique, bit-rate reduction is achieved by keeping the same parameter resolution while increasing the frame length. With this technique the parameters themselves are considered to be a set of time-varying functions, which are sampled at a higher rate for the high bit-rate parameterization and down-sampled for the lower rate parameterization. For example, a parameter stream at a 4.8 kb/s with a parameter sampling rate of 20 ms can be resampled at 30 ms to produce a parameter stream of 3.6 kb/s without decreasing the resolution of the parameter set.

In the second data conversion technique, bit-rate reduction is achieved by keeping the same parameter resolution while increasing the frame length. With this technique the parameters themselves are considered to be a set of time-varying functions, which are sampled at a higher rate for the high bit-rate parameterization and down-sampled for a lower rate parameterization. For example, a parameter stream at a 4.8 kb/s with a parameter sampling rate of 20 ms can be resampled at 30 ms to produce a parameter stream of 3.6 kb/s without decreasing the resolution of the parameter set.

Although the parameters should be low-pass filtered in time before downsampling, the parameters vary slowly enough in time that linear interpolation is sufficient. Interpolation is done in the following manner. Let t be the absolute time of the current received frame and $t_{int}$ the time of the next interpolated frame which is to be transmitted. When $t > t_{int}$, an interpolated set of parameters $\{\pi_k^i\}$ estimated from the received parameters of the previous frame $\{p_K^{i-1}\}$ and the current frame $\{p_K^i\}$ by means of the equation $$\pi_h^i = \omega'^* p_K^{i-1} + \omega^* p_h^i. \quad (8)$$

The weights w and w' are calculated with the following equations $$w = \frac{1}{bf} * (i \bmod bf); \quad (9)$$

$$\omega^1 = 1 - \omega \quad (10)$$

where bf is the frame rate of the untransformed parameters.

A specific example is described in which bit-rate reduction is performed from 4.8 kb/s to 2.4 kb/s using STC. The 4.8 kb/s parameters are sampled every 20 milliseconds while the 2.4 kb/s parameters are sampled every 30 msecs. The specific bit allocation is tabulated below.

|  | PARAMETER | |
| --- | --- | --- |
|  | 4.8 kb/s | 2.4 kb/s |
| Synchronization | 1 bit | 1 bit |
| Pitch | 7 | 6 |
| Mid-frame Pitch | 7 | 6 |
| Voicing | 3 | 3 |
| Mid-frame Voicing | 3 | 3 |
| Spectral Envelope | 73 | 52 |
| Mid-frame Envelope | 2 | 2 |

-continued

| | PARAMETER | |
|---|---|---|
| | 4.8 kb/s | 2.4 kb/s |
| Total | 96 | 72 |

For spectrum coding the following values were used for parameterization:

| | PARAMETER | |
|---|---|---|
| | 4.8 kb/second<br>0–3.8 Khz | 2.4 kb/second<br>0–3.6 Khz |
| N | 26 | 24 |
| Channel O | 6 bits | 6 bits |

At 4.8 kb/second channels 1–19 have 3 bits per channel, while channels 20–25 have 2 bits per channel. At the transformed 2.4 kb/second rate channels 1–23 have 2 bits per channel.

Pitch for both parameter sets is logarithmically coded between 50 and 400 hz; there is greater separation between the coded values as $f_o$ goes up. The spectral envelope is coded by dividing the spectrum into channels. The channel spacing is based on a mel scale. Both the number of channels and the scale are different for the different bit-rates.

There is no parameter de-scoping for the voicing.

Since the transformation is working at two different frame rates, the 4.8 kb/second parameters are decoded to derive time tracks from which the 2.4 kb/second parameters can be estimated. Interpolation is used to derive the 30 ms estimates from the 20 ms estimates. Once the 30 ms estimates are derived, they are coded using the 2.4 kb/second parameter set.

While the parameters are transmitted every 20 or 30 milliseconds, estimates of the parameters for 10 and 15 milliseconds, called the mid-frame estimate, are transmitted with each frame.

Pitch for both parameter sets is logarithmically coded between 50 and 400 Hz: there is greater separation between the coded values as $f_o$ goes up. The spectral envelope is coded by dividing the spectrum into channels. The channel spacing is based on a mel scale. Both the number of channels and the scale are different for the different bit-rates.

Since the transformation is working at two different frame rates, the 4.8 kb/s parameters are decoded to derive time tracks from which the 2.4 kb/s parameters can be estimated. Interpolation is used to derive the 30 ms estimates from the 20 ms estimates. Once the 30 ms estimates are derived, they are coded using the 2.4 kb/s parameter set.

The third data conversion technique is the heterogenous transform, which is used to transform between parameterizations which are based on different speech models. For example, two alternate ways of representing the spectral envelope $H(\omega)$ are cepstral smoothing and linear prediction. If one has chosen to code cepstral coefficients at a higher bit-rate and linear prediction coefficients at a lower bit-rate, one can reconstruct the spectral envelope from cepstral coefficients, derive an estimate of the autocorrelation function from the spectral envelope, and derive the reflection coefficients. Letting $[\hat{c}_k]$ represent the set of coded cepstral coefficients, the estimated spectrum is calculated $$H(\omega) = \sum_{k=0}^{K} c_k e^{j\omega k} \qquad (11)$$

and the set of autocorrelation coefficients are derived from the equation $$\pi_k = \frac{1}{2\pi} \int_{-\pi}^{\pi} H(\omega) e^{j\omega k} d\omega \qquad (12)$$

From the $[T_k]$ the reflection coefficients can be derived using Levinson Durbin Recursion.

This idea can be extended to produce a method for transformation between coders which use different speech models. Previously, it has been reported that the uncoded sinewave parameters could be represented interms of 10 paramters. This idea can be extended by fitting the parameters onto coded sinewave parameters. For example, if a cepstral envelope has been used to code the sinewave spectrum at some frame rate, technique 2 and technique 3 can be used to make the bit stream of coming from the sinewave coder interoperable.

As mentioned above, in the second major embodiment of the present invention multispeaker conferencing is accomplished between users of vocoders which are only capable of outputting and receiving a sigle digital data stream at a certain data rate. As shown in FIG. 2, the system of the invention includes a speech terminal for each conferee and a conferencing bridge. Each of the speech terminal units (201–203 of FIG. 2) include the handset, A/D converter, vocoder analyzer, and modem units depicted in FIG. 1. The purpose of FIG. 2 is to show that each vocoder is made up of an analyzer and synthesizer. The analyzer of the speech terminal analyzes the conferee voice and codes at the highest bit-rate allowed by the channel connecting the terminal to the bridge. The synthesizer receives encoded speech signals and produces therefrom signals which represent artificial sounds that simulate the original speech of active conferees. The conferencing bridge monitors all channels and determines which conferences are actively speaking. The bridge determines the number of active speakers and allocates the bandwidth available to each conferee based on the number of speaker parameter sets to be transmitted. After allocating the channel to the active speakers, the bridge uses parameter-space transformations to reduce the bandwidth required to encode the parameter sets. When there is only one speaker, all conferees receive the single speaker at the highest data rate allowed by each conferee's channel. When a collision between two speakers occurs the bridge allocates to each speaker half the available channel bandwidth, while performing bit-rate reduction by parameter-space transformations on the active speakers to allow both data-streams to fit in the channel. Speaker and interrupter hear each other at the full channel bandwidth.

Since the speech terminal will often receive multiple parameter sets, it must be capable of synthesizing and summing several signals. One technique that can be employed with the Sinusoidal Transform Coder allows for summation in the frequency domain before synthesis. Synthesis could be performed first and the resulting analog waveforms summed.

In an typical scenario with three conferences and two interrupting speakers over 4.8 kb/s channnels, the non-speaking listners receive the two colliding speakers at 2.4 kb/s. Each speaker receives the other speaker at the higher bit-rate, since a speaker is not fed back his own speech.

Figure 4:
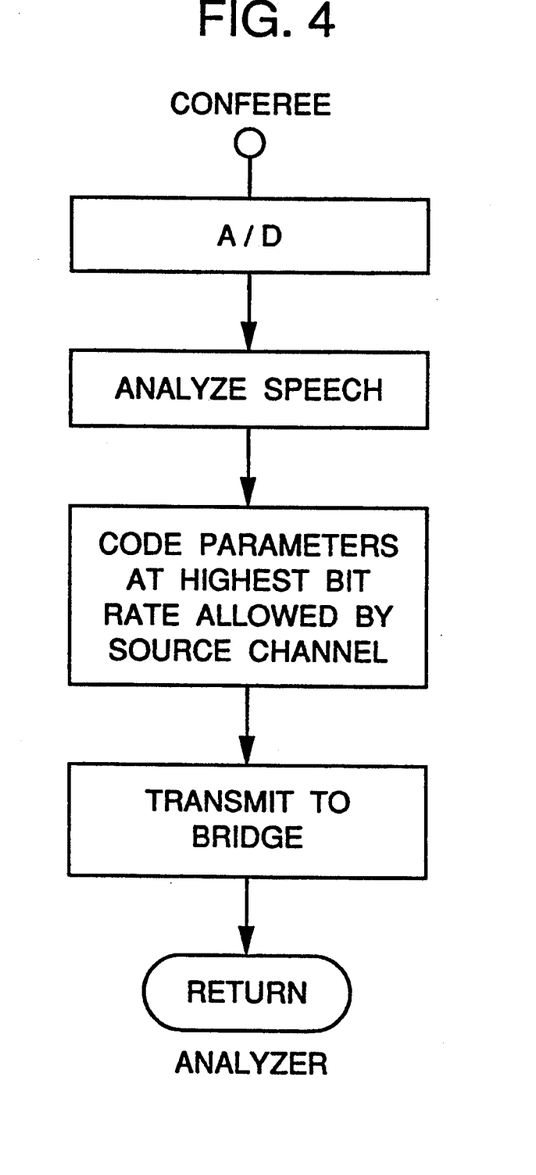
FIG. 4 is a flow chart of the process performed by each analyzer in the vocoder units.
Figure 5:
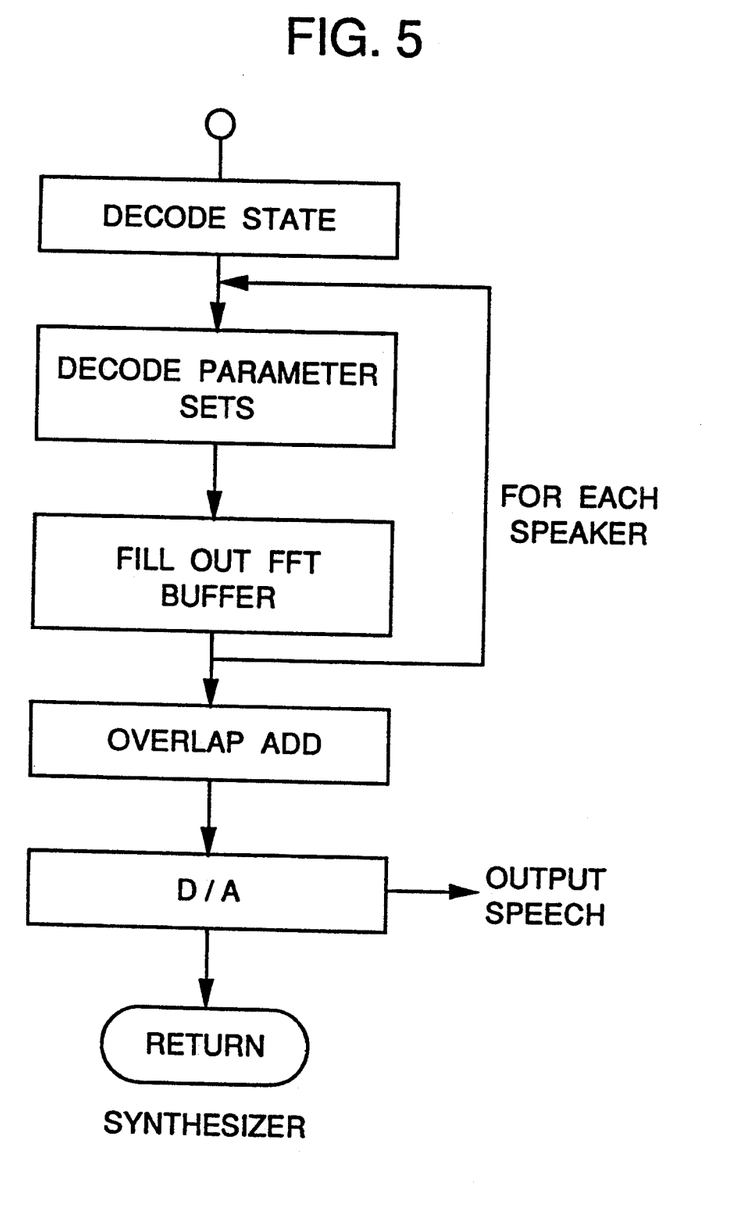
FIG. 5 is a flow chart of the process performed by each synthesizer in the vocoder units.
Figure 6:
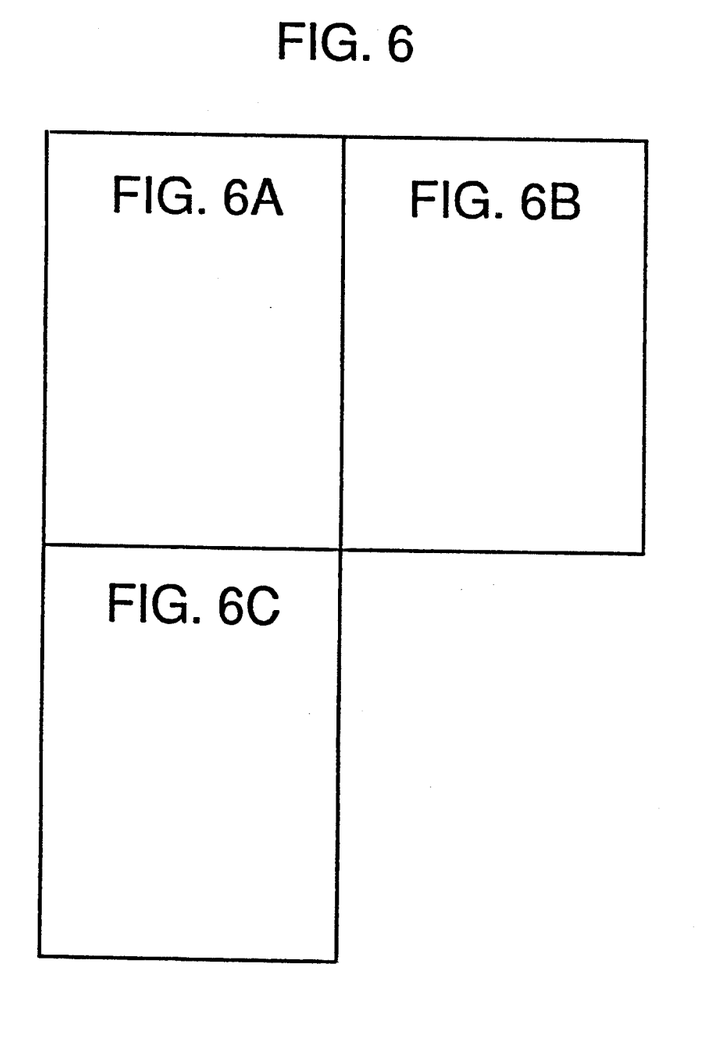
FIGS. 6, 6A, 6B and 6C are is a flow chart of the process performed by the conferencing bridge when it facilitates multispeaker conferencing.
Figure 6A:
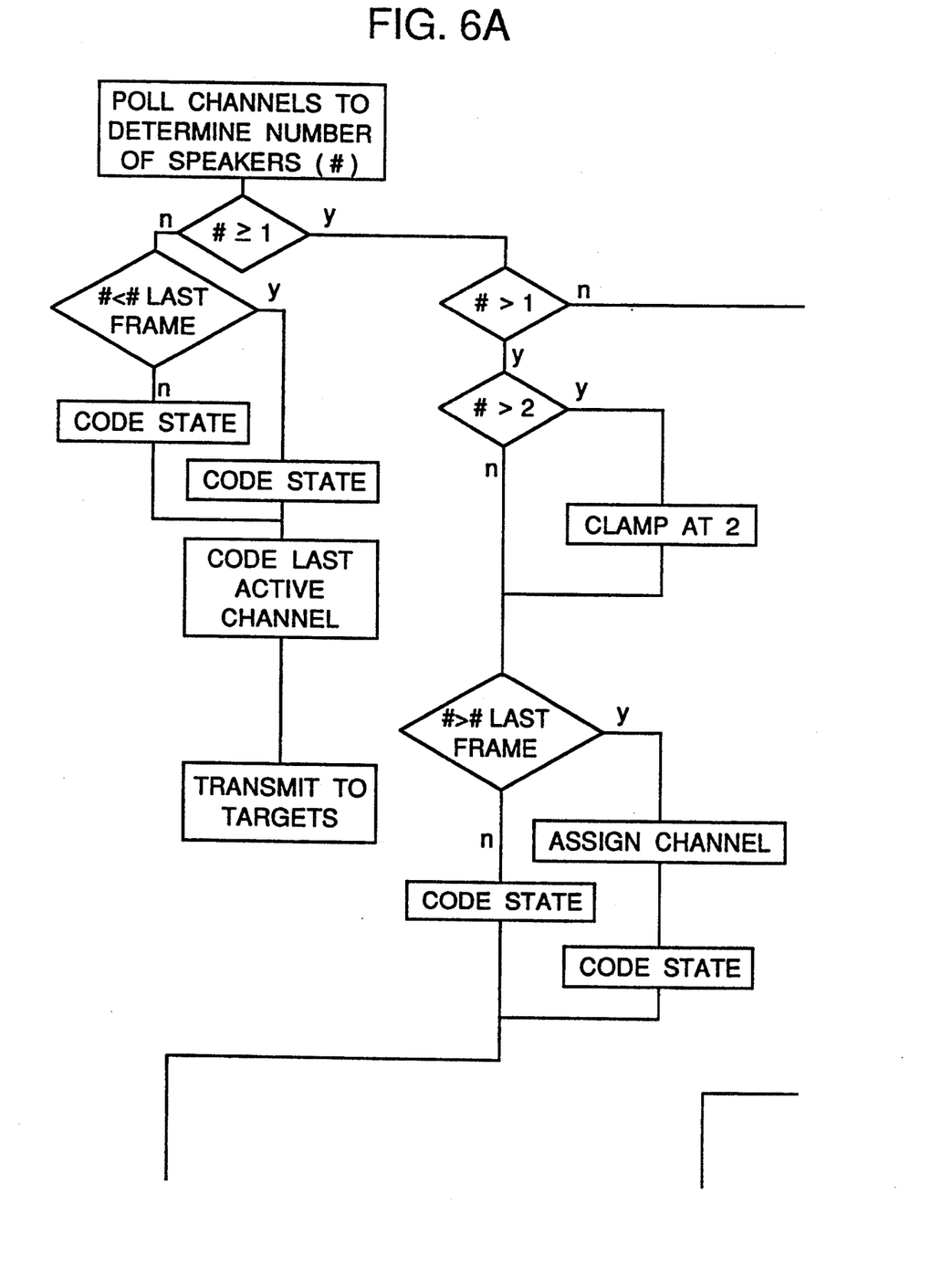
Figure 6B:
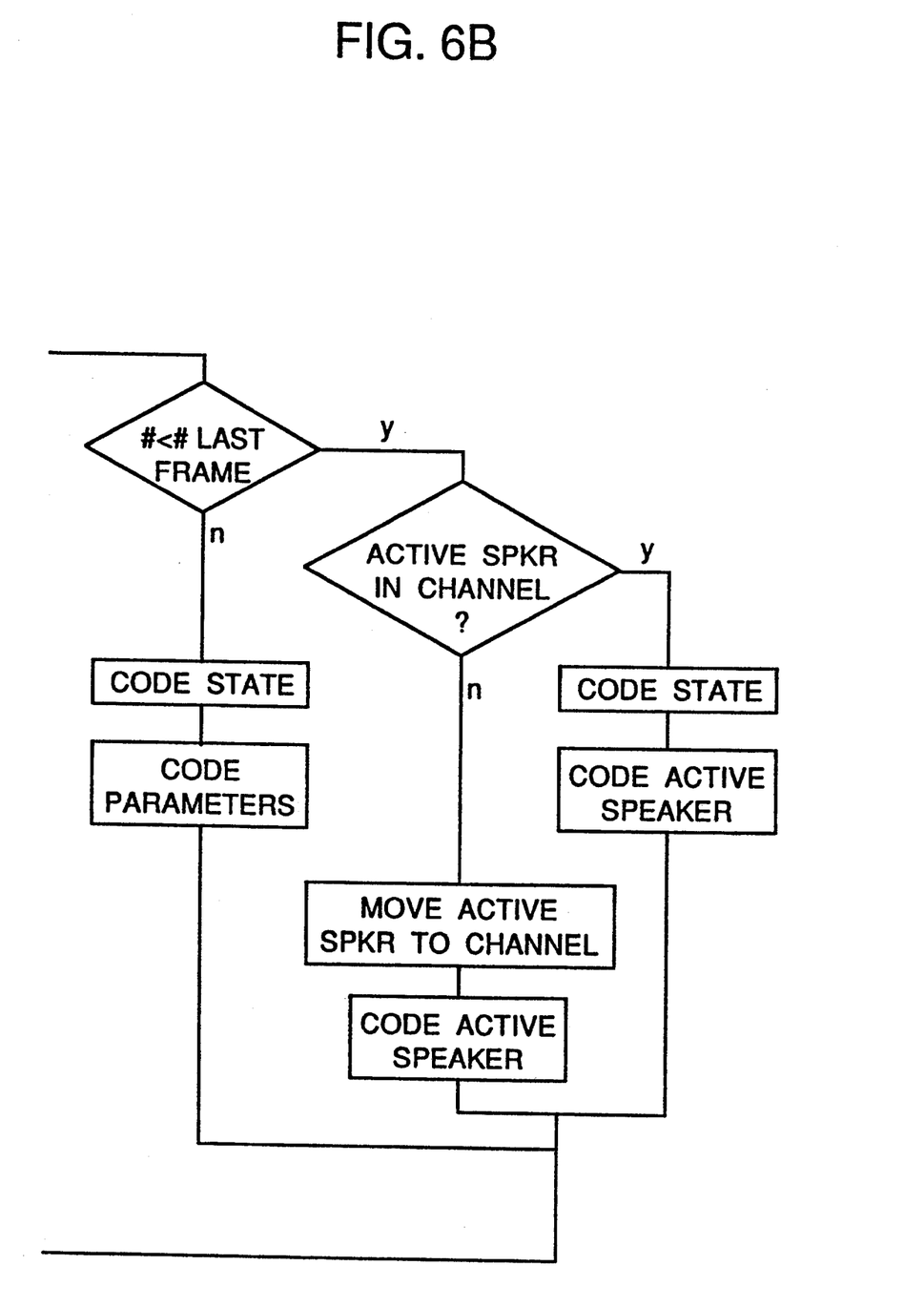
Figure 6C:
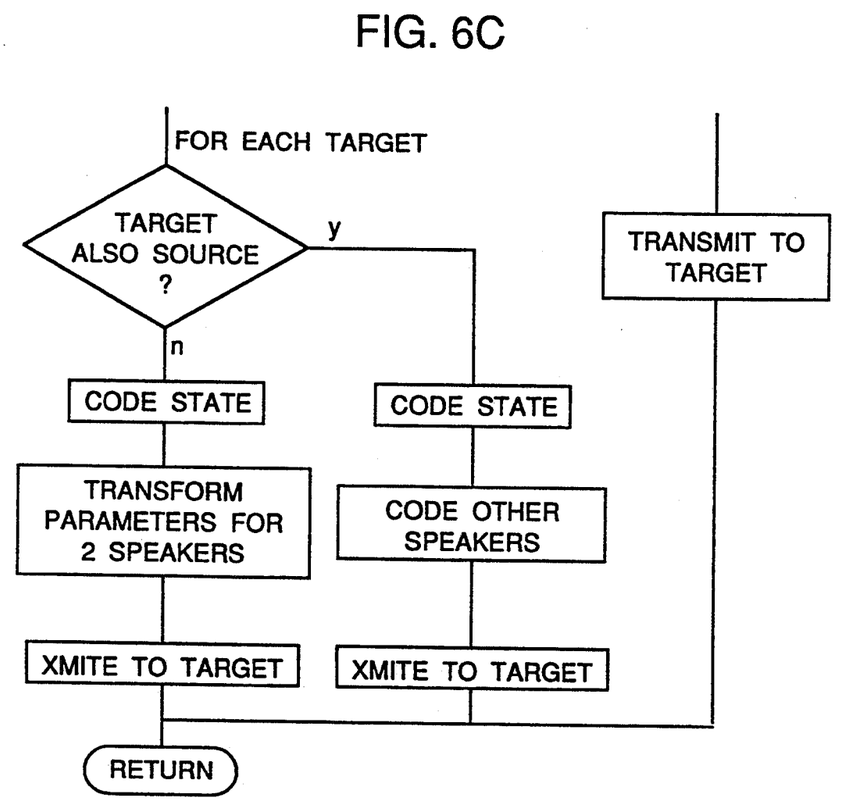

FIGS. 4, 5, and 6 give the flowcharts for analysis, synthesis, and parameter-space transformation routines respectively, used by the analyzer, synthesizer and conferencing bridge of FIGS. 1 and 2 and are discussed below after the discussion of FIGS. 2 and 3.

The present invention reprsents an improvement over signal selection techniques in that it allows for the representaion of multiple speakers, allowing the conference to flow in a manner analogous to analog confernces. It improves upon the idea of having the bandwidth to allow for two speakers, by only dividing the channel when there are multiple speakers, thereby allowing for higher quality when only one speaker is present. In addition, the principle of parameter space transformation allows for a conference that is taking place at a higher bit-rate to be reconstructed at a lower bit rate for conferences that whose channels are more bandlimited. For example, a listener who is listening is connected to the example conference given above but whose channel can only support 2.4 kb/s could here the primary speaker at 2.4 kb/s and speaker and interrupter at 1.2 kb/s.

In both of the embodiments of the invention described above, the conferencing bridge 100 of FIGS. 1, 2 and 3 can be implemented using a microprocessor which is programmed with the computer program in the microfiche appendix and connected to the modem units as illustrated. Once suitable computer is the SUN Sparc 370, but other equivalent computers can be used. Similarly the modem units, A/D converters and vocoders are commercially-available items and need not be described in detail.

FIG. 3 is a block diagram showing the output signal path from the conferencing bridge 100 back to the three telephone bandsets 101-103 of FIG. 1. As indicated above the bridge has two basic functions: 1) signal routing; and 2) bit-rate reduction on speaker parameter sets to allow for multiple speakers to be transmitted through the channel.

For signal routing the conferencing bridge considers each terminal a source, the speech analyzer with an assocaited target, the speech synthesizer. When there is only one active source, that is, one speaker, all conferees (except the active speaker, all conferees (except the active speaker receive the same set of parameters. When there are two active speaker at the highest rate, while passive listeners would receive the two parameter sets of the two active speakers, each transformed to a lower bit-rate. FIG. 2 shows a typical scenario with three conferees, two of which are actively speaking.

When one speaker is speaking the conferencing bridge will receive the data from the telephone handset 101 at the full 4.8 kb/s data rate. Since there is no conflict between speakers, the conferencing bridge outputs the voice signal back through the bridge modems 191-193, phone lines 150, speaker modems 131-133, synthesizers 301,303, digital-to-analog converters (DAC) 311-313 back to all three handsets 101-103.

When two speakers are talking simultaneously, the conferencing bridge will receive each of the bit data streams at the full 4.8 kb/s data rate, but will perform digital data comprehension to output a combined data signal with each voice represented in a 2.4 kb/s data stream. Similarly, each data stream of three speakers would be compressed into a 1.6 kb/s data stream; 1.2 kb/s for four speakers, 0.96 kb/s for five speakers etc. When compressing a data stream voice quality is traded off in exchange for the use of a minimum number of bits to represent the orignal voice. The principle of the present invention is limited only by the ability to retain vocie quality as the individual data systems of multiple speakers are first compressed (in proportion to the number of speakers) and then combined so that their sum represents the total bit stream data rate being used. The combined data stream, when processed by the synthesizers 301-303, and converted back into analog by the DAC units 311-313 will sound like the conversation of the conferees on the telephone handsets 101-103.

The present invention includes the process of multi-speaker conferencing over a narrowband channel at a system data rate in which digital signal compression and digital signal summation are used as follows. First, in the example shown above, the conferencing bridge monitors the system and counts the number of conferees speaking. When one conferee is speaking, his voice is conducted to all users of the system at the full system data rate (4.8 kb/s in the example used). When multiple conferees are speaking at once, the conferencing bridge counts the number of active conferees, and identifies the number by the integer N. This means that the digital data stream of each conferee must be compressed down to a bit stram rate given by: SDR/N, where SDR is the system data rate.

Finally the conferencing bridge combines and forwards all the compressed data streams in a combined digital signal summation data stream back to all users of the system such that the combined digital signal summation data stream has a bit data rate that equals the rate of the system data rate. In developing the present invention, the system data rate used by one particular vocoder eas 4.8 kb/s, but the principles of the present invention can apply to any system data rate, and is not limited to the example used. Vocoders have a data rate which ranges from 2.4 to 32 kb/s, and the invention can be applied to any of these systems.

FIG. 4 is a flow chart of the process used by each analyzer in the vocoders. Analog speech is converted to digital, analyzed and encoded at the system data rate. The significance of FIG. 4 is that each analyzer analyzer operates at the hightest bit rate allowed by the system, and compression and digital signal summation are all performed at the conferencing bridge.

FIG. 5 is a flowchart of the process used by each syntehesizer in the vocoders. The synthesizers each receive encoded digital data streams and produce therefrom artificial speech that represent the voices originally input into the handsets. In the present invention, the data stream received by the synthesizers is always at the system data rate (4.8 kb/s in this example) and represents either one conferee or any number of conferees speaking simultaneously.

FIG. 6 is a flow chart of the process performed by the conferencing bridge. As mentioned above, the conferencing bridge can be a microprocessor programmed with the source code contained in the microfiche appendix. As described above, the process, the process first counts the number of active conferees and determines therefrom the rate to which each data stream needs to be compressed into to maintain an output at the system data rate.

The control logic for the bridge is fairly simple. Two slots are availaable for active speakers on a first-come, first-serve basis. New speakers that begin while both slots are occupied are denied access to a new newly freed channel to prevent speakers from being represented in mid-sentence. Since some interpolation of parameters is done, care must be taken to properly assocaite parameters going into and out of collisions. For this purpose the bridge recognizes and codes one of four states. One state represents no change from the previous state. Another state signals an increase in the number of speakers from one or two (one speaker is assumed); the other two states identify which speaker is still speaking during the transition back to one speaker.

The use of overlap-add synthesis allows for a particularly simple method for synthesizing multiple speakers. With the over-lap add technique a speaker's parameters, pitch voicing, and spectrum, are used to fill out an FFT buffer. The inverse transform is taken and summed in the usual overlap-add manner. With two speakers, the two FFT buffers are added before taking the inverse transform . In this way synthesis of two speaker is no more complex than one speaker.

The idea of splitting the channel to allow for the parameter sets of multiple speakers depends on an effective transformation from a higher bit-rate to a lower bit-rate. Such a transformation must be able to work on a received set of parameters without changing the source rate. A bit-rate reduction can be performed by using a suite of embedded coders, coders coders for which the parameters of the higher bit-rate coders contain coarser resolution parameters for a lower bit-rate system.

The digital data signal compression can be performed by the conferncing bridge using any of three digital data conversion techniques described above. However, the present invention is not limited to these three techniques alone, nor is it mandatory that the conferencing bridge be a computer. The process of FIG. 6 could be performed by a hardwire circuit as well as a computer programmed with the source code listed in the attached microfiche appendix. Similarly, the digital data received by the conferencing bridge is not limited to digitized vocie data, but can include other digital data signals including visual images.

The proposed conferencing system can be implemented using embedded coders, coders which have the lower bit rate parameters embedded in the parameters of the higher bit rate coder.

Figure 7:
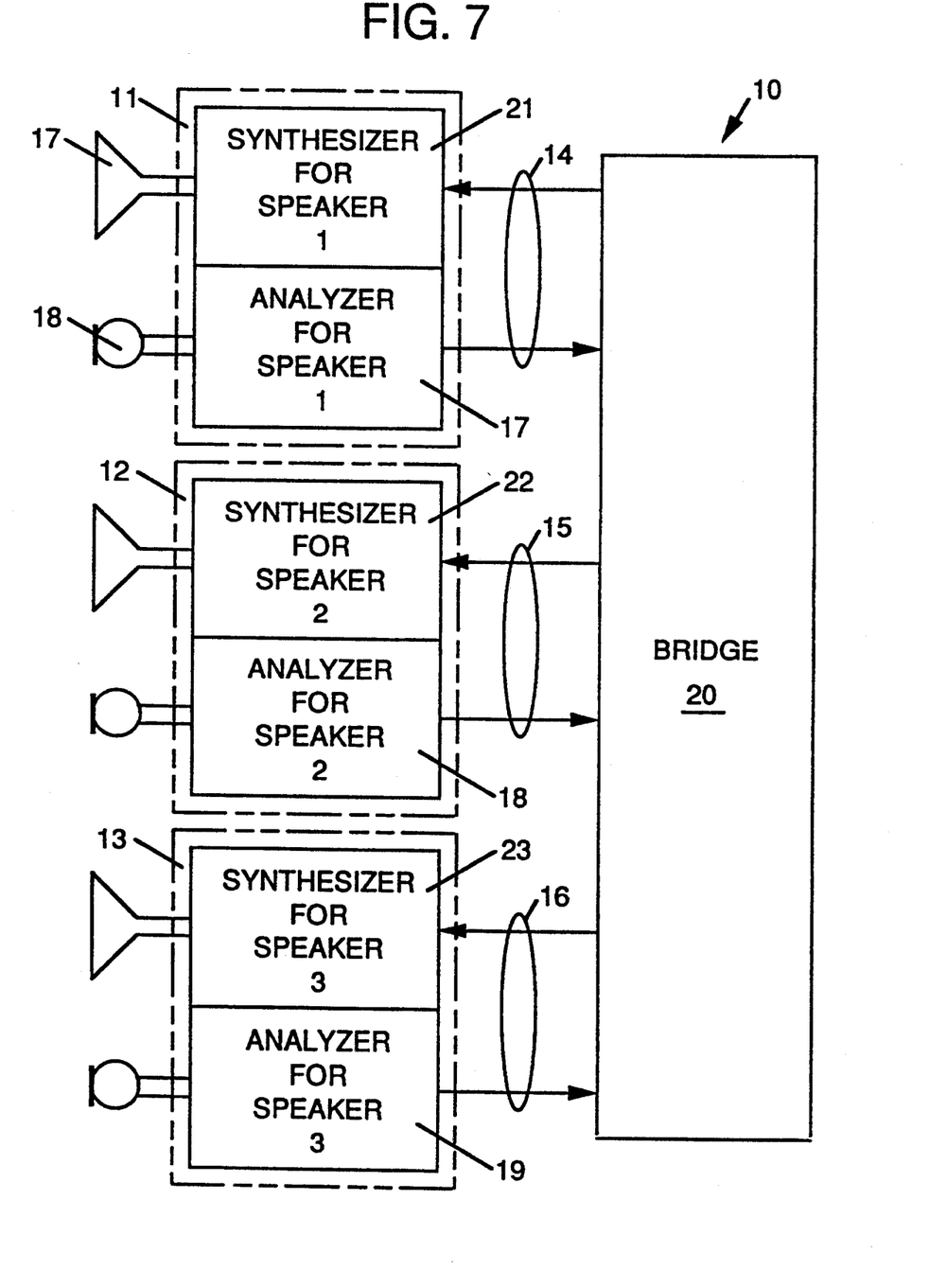
FIGS. 7 and 8 are block diagrams which depict two embodiments of the present invention.
Figure 8:
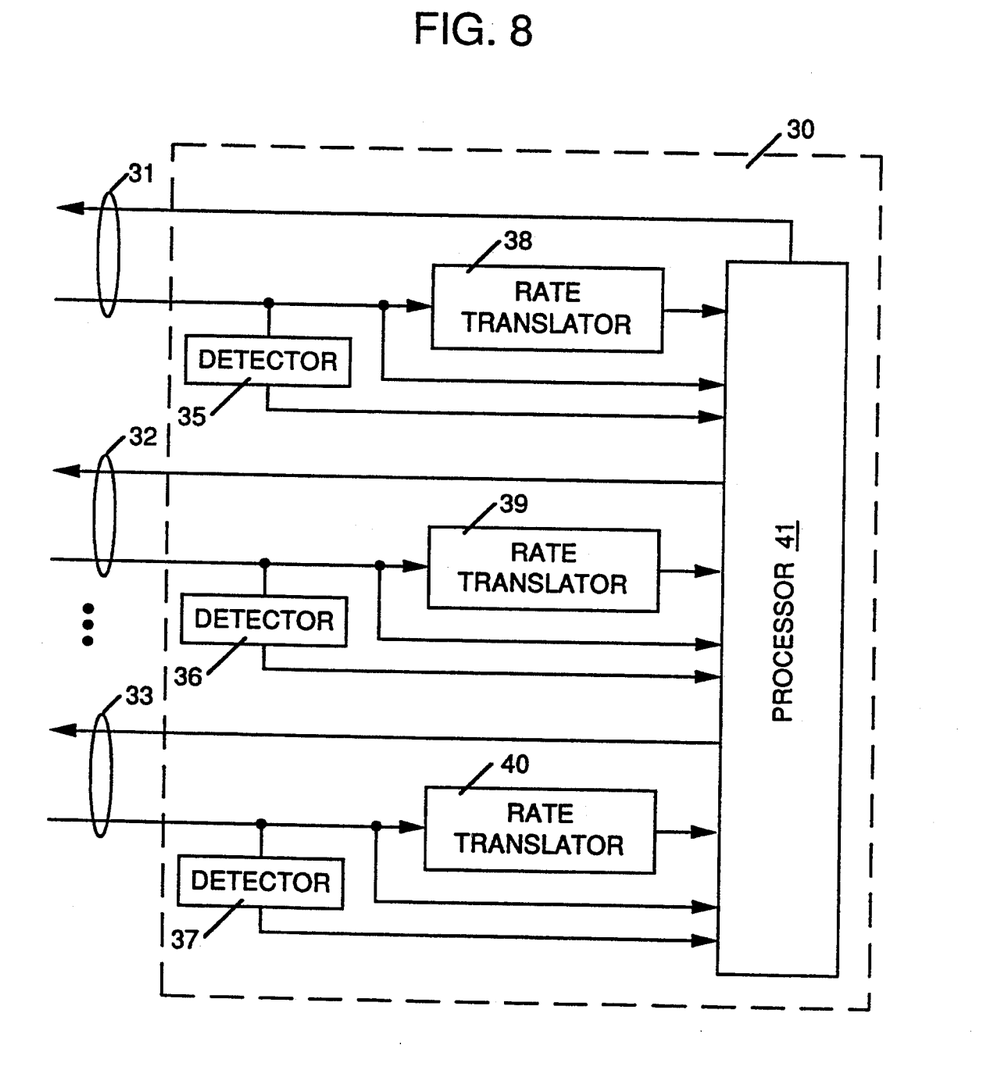

FIGS. 7 and 8 are illustrative of two embodiments of the present invention. FIG. 7 depicts the conferencing bridge 20 which is connected by communication links 14–16 to multiple conferees using vocoders 21–23. As mentioned above, each of the communication links 14–16 can include but are not limited to: modems and telephone lines, satellite communication links, radio, and laser communication network.

Each of the vocoders 21–23 has an analyzer for encoding and digitizing the user outputs, and a synthesizer for decoding a combined conference signal received from the conferencing bridge. Each of the vocoders 21–23 has a user interface 11–13 which includes an input port device 18 and an output port device 17. These input and output port devices include, but are not limited to the microphone and speaker units of telephone handsets.

FIG. 8 is a block diagram of an application of the principles of the present invention that accomplishes both multispeaker conferencing and the interface of vocoders with different system data rates. The conferencing bridge unit 30 includes: a multiconferencing processor 41 which receives, combines and outputs a combined conference signal to users via communication links 31–33; multiple detector units 31–33, and multiple rate translator units 38–40.

Each of the detector units 35–37 output a detector signal to the multiconferencing processor 41 when a conferee on its particular line is speaking. Each of the rate translators 38–40 may be an individual microprocessor which performs one of the rate conversion techniques described above. The multiconferencing processor 41 is a data processor which outputs a combined conference signal to each of the conferees at their particular data rate using the techniques described above.

While the invention has been described in its presently preferred embodiment it is understood that the words which have been used are words of description rather than words of limitation and that change within the purview of the appended claims may be made without departing from the scope and spirit of the invention in its broader aspects.

What is claimed is:

1. A process, of facilitating multispeaker conferencing for users of a digitally encoded voice system, wherein each of said users is capable of outputting encoded digital voice signals in a bit stream at a system data rate, wherein said process comprises the steps of:

counting a number of active conferees to produce thereby a count number N, said active conferees being users of said digitally encoded voice system which are speaking when said counting step is performed;

compressing each of the encoded digital voice signals produced by said active conferees down to a plurality of compressed digital signals which each have a compressed data rate, wherein said digitally encoded voice system used in said process comprises a set of vocoders which operate over a narrowband with said system data rate ranging substantially between 2.4 and 32.0 kb/s, and wherein said comprising step comprises digitally compressing each of said encoded voice signals into said compressed digital signals such that their compressed data rate has a bit rate given by SDR/N, where SDR is the system data rate, and N is the number of active conferees;

a digital signal summation step, in which the compressed digital signals are combined to output thereby a combined compressed digital signal which is transmitted to said users at the system data rate; and decoding said combined compressed digital signal to thereby an artificial voice signal to said users of the digitally encoded voice system, wherein said signal represents voices of all the active conferees which are speaking.

2. A process, as defined in claim 1, wherein said counting step is performed by counting users of a vocoder system which has the system data rate of about 4.8 kilobits per second, and wherein said compressing step comprises:

compressing each of the encoded digital voice signals into approximately a 2.4 kilobit per second data stream when there are two active conferees;

compressing each of the encoded digital voice signals into approximately a 1.6 kilobit per second data stream when there are three active conferees;

compressing each of the encoded digital voice signals into approximately 1.2 kilobit per second data stream when there are four active conferees;

compressing each of the encoded digital voice signals into approximately 0.96 kilobit per second data stream when there are five actve conferees; and compressing each of the encoded digital voice signals into approximately 0.8 kilobit per second data stream when there are six active conferees.

3. A system for facilitating multispeaker conferencing for users of a digitally encoded voice system, wherein each of said users is capable of outputting encoded digital voice signal in a bit stream at a system data rate, wherein said digitally encoded voice system used in said system comprises a set of vocoders which operate over a narrowband with said system data rate ranging between 2.4 and 32.0 kb/s, and wherein said system comprises:

a means for counting a number of active conferees to produce thereby a count number N, said active conferees being users of said digitally encoded voice system which are actually speaking;

a means for compressing each of the encoded digital voice signals produced by said active conferees down to a plurality of compressed digital signals which each have a compressed data rate; and a means for decoding the combined compressed digital signal to output thereby an artificial voice signal to said users of the digitally encoded voice system, wherein said artificial voice signal represents voices of all the active conferees which are speaking.

4. A process of facilitating multispeaker conferencing for users of a digitally encoded voice system, wherein each of said users is capable of outputting encoded digital voice signals in a bit stream at a system data rate, wherein said digitally encoded voice system used in said process comprises a set of vocoders which operate over a narrowband with said system data rate ranging substantially between 2.4 and 32.0 kb/s, and wherein said process comprises the steps of:

monitoring the users as they output said digital voice signals serially when one of said users is speaking, and monitoring said users as they output said digital voice signals simultaneously, when multiple users and speaking, wherein said monitoring step includes counting a number of active conferees to produce thereby a counter number N, said active conferees being users of said digitally encoded voice system which are speaking when said monitoring step is performed; and producing a conferencing signal usable by all of said users, said conferencing signal representing one digital voice signal when one of said users is speaking, said conferencing signal representing multiple digital voice signals when multiple users are speaking simultaneously.

5. A process of facilitating multispeaker conferencing for users of a digitally encoded voice system, wherein each of said users is capable of outputting encoded digital voice signals in a bit stream at a system data rate, wherein said digitally encoded voice system used in said process comprises a set of vocoders which operate over a narrowband with said system data rate ranging substantially between 2.4 and 32.0 kb/s, and wherein said process comprises the steps of:

monitoring the users as they output said digital voice signals serially when one of said users is speaking, and monitoring said users as they output said digital voice signals simultaneously, when multiple users are speaking; and producing a conferencing signal usable by all of said users, and conferencing signal representing one digital voice signal when one of said users is speaking, said conferencing signal representing multiple digital voice signals when multiple users are speaking simultaneously wherein said producing step comprises digitally compressing each of said encoded digital voice signals into said compressed digital signals such that their compressed data rate has a bit rate given by SDR/N, where SDR is the system data rate, and N is the number of active conferees.

6. A system for facilitating multispeaker conferencing for users of a digitally encoded voice system, wherein each of said users is capable of outputting encoded digital voice signal in a bit stream at a system data rate, wherein said digitally encoded voice system used in said system comprises a set of vocoders which operate over a narrowband with said system data rate ranging between 2.4 and 32.0 kb/s, and wherein said system comprises:

a means for monitoring the users as they output said digital voice signals serially when one of said users is speaking, and monitoring said users as they output said digital voice signals simultaneously, when multiple users are speaking; and a means for producing a conferencing signal usable by all of said users, said conferencing signal representing one digital voice signal when one of said users is speaking, said conferencing signal representing multiple digital voice signal when multiple users are speaking simultaneously.

7. A system, as defined in claim 6, wherein said producing means digitally compresses each of said encoded digital voice signals into said compressed digital signals such that their compressed data rate has a bit rate given by SDR/N, where SDR is the system data rate, and N is the number of active conferees.

* * * * *